Nov. 4, 1952 C. H. HOEPPNER 2,616,965

BINARY CODING DEVICE

Filed March 22, 1950 3 Sheets-Sheet 1

INVENTOR
CONRAD H. HOEPPNER
BY Elmer J. Gorn
ATTORNEY

Nov. 4, 1952

C. H. HOEPPNER 2,616,965

BINARY CODING DEVICE

Filed March 22, 1950

3 Sheets-Sheet 2

INVENTOR
CONRAD H. HOEPPNER
BY Elmer J. Gorn
ATTORNEY

Nov. 4, 1952 C. H. HOEPPNER 2,616,965

BINARY CODING DEVICE

Filed March 22, 1950 3 Sheets-Sheet 3

INVENTOR
CONRAD H. HOEPPNER
BY Elmer J. Gorn
ATTORNEY

Patented Nov. 4, 1952 2,616,965

UNITED STATES PATENT OFFICE 2,616,965

BINARY CODING DEVICE

Conrad H. Hoeppner, Waltham, Mass., assignor to Raytheon Manufacturing Company, Newton, Mass., a corporation of Delaware Application March 22, 1950, Serial No. 151,131

8 Claims. (Cl. 178—43.5)

This invention relates to conversion of signal intelligence to binary digital code.

In many instances, it is highly desirable to convert intelligences such as, for example, pulse position modulation, pulse time modulation, and varying voltage signals to the binary code. By such conversion, recording and reproduction of the intelligence are simplified and the intelligence may be stored without deterioration. Intelligence so converted is relatively easily transmitted from station to station and is in a useful form for direct use in digital computers.

One limitation in the amount of such information which may be converted to the binary code and the accuracy with which intelligence may be recorded is the speed of binary counters used in code conversion. Conventional binary counting circuits as, for example multivibrators, have a counting frequency limitation of between four and six megacycles. For rates above this range conventional counting circuits are generally unsatisfactory. Thus, if the nature of intelligence makes it desirable, for example, to use a code having 128 cycles within a twenty microsecond interval or intelligence period, a counting frequency of 6.4 megacycles would be required which is beyond the practical range of counters in the past.

Pursuant to the present invention, counting frequencies of over eighteen megacycles may be successfully used and recorded with a high degree of accuracy. This is achieved by providing a delay line tapped at suitable intervals to form a counter for those digits which change too rapidly for conventional counting devices. The delay line may then be followed by conventional counters, such as, for example multivibrator counters, for any remaining digits in the code. Also, by tapping the delay line at the above intervals, the effective counting frequency is also greatly increased, thus permitting the use of a relatively low frequency oscillator for generating the counting pulses.

A present embodiment incorporates the above in a novel arrangement for periodically sampling and recording a varying voltage intelligence signal in the binary code. In this embodiment, a seven digit code is used. A dual control grid tube, herein called a coincidence tube, is used for each of the digits for obtaining at any selected instant the count on the counters. The first three digits in this instance are supplied by suitable taps along the above-mentioned delay line. The remaining four digits are supplied from conventional counting circuits. The rising voltage of a saw-tooth voltage generator is compared to the voltage intelligence signal. The time interval for the voltage of the saw-tooth generator to reach that of the voltage signal provides the intelligence interval which is converted into the binary code in the present embodiment. To insure accuracy in interval determination, a quantizing arrangement is used with the saw-tooth voltage generator. This arrangement provides for a small, abrupt quantum or voltage peak to occur in the rising voltage pattern of the saw-tooth generator. A peak of this type is made to occur once for each counting pulse in the binary counters and located on the rising saw-tooth voltage at a point corresponding to the time interval represented by the pulse. Thus, the comparison of the saw-tooth voltage to the signal voltage will occur in discrete steps such that a sampling pulse resulting from the comparison will occur only at one of these peaks and thus in synchronism with the counting picture produced by the counters at the coincidence tubes. The present embodiment achieves this quantization scheme by coupling points of the above-mentioned delay line corresponding to the individual counting pulses to the saw-tooth voltage generator in a manner to produce these quanta peaks at corresponding time intervals in the rising voltage of the saw-tooth generator.

A second embodiment of the invention is adapted for converting pulse position and pulse time intelligence signals into binary code. In this embodiment, a synchronism pulse of the pulse intelligence is made to cause counting pulses of a suitable frequency to appear at coincidence tubes as in the first embodiment. The signal or information pulse of the pulse intelligence is resynchronized by a separate multivibrator, gate and blocking oscillator arrangement so as to produce a triggering pulse for sampling the counter reading on the coincidence in synchronism with a distinct count representing the interval between the above two pulses.

The foregoing and other objects and features of the invention will become more apparent from the following description taken in connection with the accompanying drawings wherein.

Figure 1:
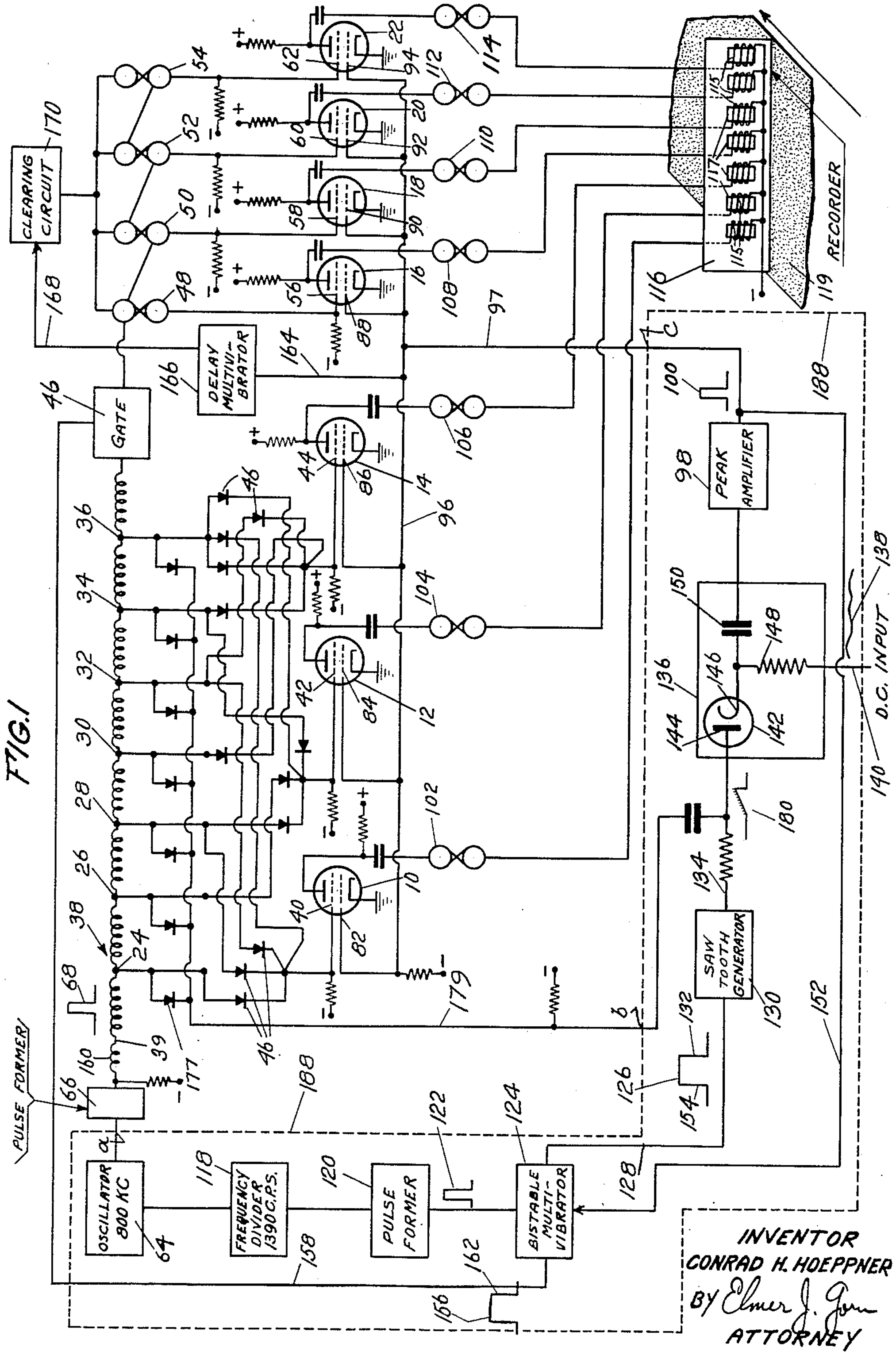
Fig. 1 is a schematic view of an embodiment of the invention for converting varying voltage intelligence to binary code.
Figure 2:
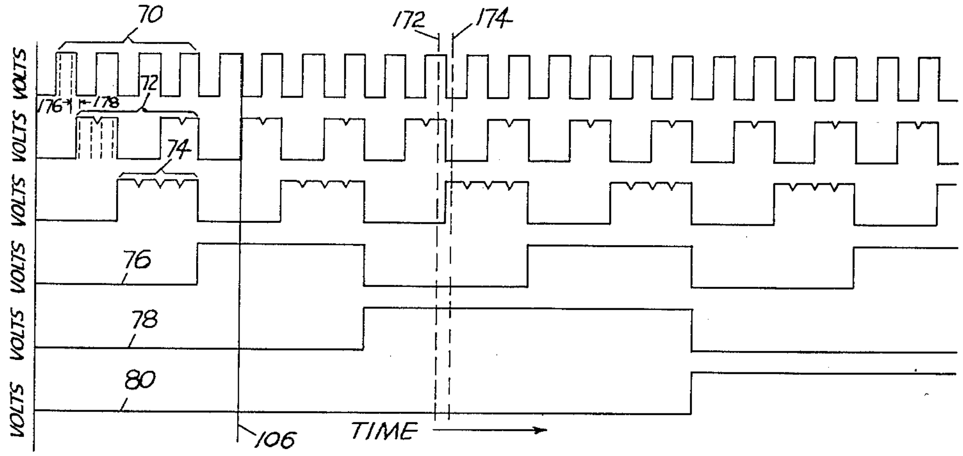
Fig. 2 is a graph illustrating the pulse picture at one of the control grids of the coincidence tubes in the invention.

Referring to Fig. 1 in more detail, dual control grid tubes 10, 12, 14, 16, 18, 20 and 22, respectively, as for example high vacuum tubes of the 6AS6 type and herein called coincidence tubes, are used for obtaining a sampling binary code count at any desired instant. Each tube represents a digit in the binary code. In this instance, the first three digits represented by coincidence tubes 10, 12 and 14, are obtained from suitable taps 24, 26, 28, 30, 32, 34 and 36, preferably at equal time delay intervals, on delay line 38. Delay line 38, as will be seen, has preferably a time delay such that, when a counting pulse reaches the end of the delay line, another counting pulse is just entering the line at point 39. Control grid 40 of coincidence tube 10 is connected to points 24, 28, 32 and 36 on delay line 38. Control grid 42 of coincidence tube 12 is connected to points 26, 28, 34 and 36 of delay line 38, and control grid 44 is connected to points 30, 32, 34 and 36 of delay line 38. Unidirectional current devices such as crystals or diodes 46 are used in the lines connecting the above points on delay line 38 and control grids 40, 42 and 44 of the coincidence tubes to prevent short circuiting. The delay line 38 passes through a suitable gate 46 which may be a single electron tube gate to counting circuits 48, 50, 52 and 54 which in this instance are bistable multivibrator circuits arranged in conventional manner, as binary counters. Counting circuits 48, 50, 52 and 54 are connected to control grids 56, 58, 60 and 62 of coincidence tubes 16, 18, 20 and 22, respectively. In this manner, a seven digit counting arrangement is achieved with the first eight numbers being effected from the delay line 38 in the coincidence tubes 10, 12 and 14. The seven digits represent a maximum count of 127. A higher count may be obtained by adding additional counting circuits and corresponding coincidence tubes. When the gate 46 is open, an oscillator 64 combined with pulse former 66, produces pulses 68, preferably of the square wave type which travel down the delay line 38 and through gate 46 to the binary counters 48, 50, 52 and 54. Because of the connection of control grids 40, 42 and 44 of coincidence tubes 10, 12 and 14, respectively, on the delay line 38, each pulse 68 will appear as four pulses 70 at control grid 40, four pulses 72 at control grid 42, and four pulses 74 at control grid 44, shown in Fig. 2 and representing a count of seven. The picture at grids 56, 58, and 60, respectively, because of counting circuits 48, 50 and 52 will appear as curves 76, 78 and 80 in Fig. 2. The curve for control grid 62 has not been shown because the count represented in Fig. 2 is not sufficiently high to produce any change at the grid 62. Control grids 82, 84, 86, 88, 90, 92 and 94 of the coincidence tubes are connected to line 96. Line 96 is connected by line 97 to a peak amplifier 98 from which at periodic intervals to be hereinafter described sampling pulses 100 occur in line 96. These pulses will appear at control grids 82, 84, 86, 88, 90, 92 and 94 simultaneously. If, at the time the sampling pulse 100 appears at the coincidence tubes, a counting pulse from delay line 38 or counting circuits 48, 50, 52 and 54 also exists at the other control grid, those tubes having such two coincident pulses will cause current to flow so as to produce signal pulses at their anodes which are registered in those of the signal registering circuits 102, 104, 106, 108, 110, 112 and 114 connected to the anodes of the particular coincidence tubes. The register circuits are in this instance monostable multivibrators. A monostable multivibrator inherently flops back to its stable state at the end of a delay period after it has been made to operate by a triggering pulse. The delay may be varied by adjusting its timing capacitance and resistance circuit, for example. In this instance, the monostable multivibrators are arranged with sufficient delay to permit recording of the registered signals from the coincidence tubes or a suitable recorder 116. A suitable multichannel recorder for this purpose may consist of an inductance coil 115 connected to each of the register circuits 102, 104, 106, 108, 110, 112, and 114. Those of the register circuits which receive signal pulses from the coincidence tubes are energized to cause current to flow through the corresponding inductance coils 115 which, through their cores 117, produce a magnetized spot in a coating 119 of magnetic material on a recording sheet. By moving the recording sheet as in the direction of the arrow for each successive sampling, a permanent record of the binary numbers may be obtained.

Referring to Fig. 2, if a sampling pulse 100 occurred in line 96 with its leading edge at a time represented by line 106, coincidence tube 10 would not be in proper condition to conduct; coincidence tube 12 would conduct; coincidence tube 14 would not conduct; coincidence tube 16 would conduct; and coincidence tubes 18, 20 and 22 would not conduct. In this instance, only the monostable multivibrators 104 and 108 connected to the anodes of coincidence tubes 12 and 16 would register a signal which, in turn, would be recorded on recorder 116. If a 0 or a blank space is used to represent those multivibrators which do not register a signal, and a dot or a 1 is used to represent those multivibrators which do register a signal, the appropriate code picture for the above example may be shown as 0 1 0 1 0 0 0 which, is this instance, is the binary code for a count of ten. In like manner, other counts in this code would appear as follows:

| | | | | | | | |
|---|---|---|---|---|---|---|---|
| 0 | 0 | 0 | 0 | 0 | 0 | 0 | 0 |
| 1 | 0 | 0 | 0 | 0 | 0 | 0 | 1 |
| 0 | 1 | 0 | 0 | 0 | 0 | 0 | 2 |
| 1 | 1 | 0 | 0 | 0 | 0 | 0 | 3 |
| 0 | 0 | 1 | 0 | 0 | 0 | 0 | 4 |
| 0 | 0 | 0 | 1 | 0 | 0 | 0 | 8 |
| 0 | 0 | 0 | 0 | 1 | 0 | 0 | 16 |
| 1 | 1 | 1 | 1 | 1 | 1 | 1 | 127 |

Thus any number from 0 through 127 may be obtained in the present embodiment. It should be noted that, while the above digits read from left to right, they may be arranged to read from right to left or in any desired sequence by rearranging lead lines from the registers to recorder 116 or from the counters to the control grids of the coincidence tubes.

A frequency divider 118, having frequency of a much smaller order than the oscillator 64, is led through a pulse former 120 from which signal pulses 122, preferably of the square wave type, actuate a gate which in this instance is a bistable multivibrator gate 124 which, in turn, produces a square wave 126 in line 128 leading to a saw-tooth generator 130. The leading edge 132 of the square wave 126 causes the saw-tooth voltage generator to produce a rising voltage in line 134 leading to a comparator 136 to which is led an intelligence voltage signal 138 by line 140 whose voltage is to be sampled at periodic points and converted to the binary code. When the voltage in the line 134 has risen to a point slightly above that of the voltage in the signal 138, the comparator 136 produces a pulse which is amplified by peak amplifier 98 and appearing as sampling pulse 100 in line 96. One such comparator may consist of a diode 142 whose anode 144 is connected to saw-tooth voltage generator 130 by line 134 and to whose cathode 146 is led the voltage signal 138 through line 140 and resistance 148. The cathode 146 may be suitably coupled to the peak amplifier 98 through a capacitance 150. The pulse 100 is also led from the peak amplifier 98 through line 152 back to the bistable multivibrator 124 so as to terminate the gating pulse 126 as at 154, thereby stopping the saw-tooth voltage generator 130.

At the instant that square wave 126 was started by the multivibrator 124, a similar square wave 156 is started through line 158 to open the gate 46 so as to admit counting pulses from the pulse former 66 and delay line 38 through the counting circuits 48, 50, 52 and 54. Pulse 122 and pulse 68 are preferably so timed that the pulse 68 will be just starting from the point 39 at the beginning of the delay line 38 when the pulse 122 actuates multivibrator 124. This may be done by inserting a suitable length of signal delay line 160, similar to delay line 38 in front of the point 39. In this manner, the start of voltage generation of the saw-tooth voltage generator 130 is synchronized with the start of counting pulses in the delay line 38 and counting circuits 48, 50, 52 and 54.

The gate 46 remains open for the duration of square wave 156. The square wave 156 is terminated similarly to square wave 126. Termination is effected at 162 when the bistable multivibrator 124 is energized through line 152 by pulse 100. This prevents further counting pulses from going beyond the gate 146 and permits resetting of counters 48, 50, 52 and 64 in preparation for the next count. The sampling pulse 100, besides operating multivibrator 124 and obtaining a reading of the counter as explained above, also passes on through line 164 to a signal delay device such as a delay multivibrator 166, where a short delay occurs to insure no interference in obtaining the binary code count on the coincidence tubes. After the short delay, a pulse from the delay multivibrator 166 passes through line 168 to a conventional clearing circuit 170 which resets the counting circuits 48, 50, 52 and 54 to a zero condition. Since the counting circuits 48, 50, 52 and 54 are in this instance bistable multivibrators, the clearing circuit may include an amplifier to amplify the pulse in line 168 and lines running to trigger those tubes in the multivibrators which represent a zero counting condition. After resetting in this manner, the apparatus is again ready to start a new cycle for sampling the signal voltage 138.

Figure 3:
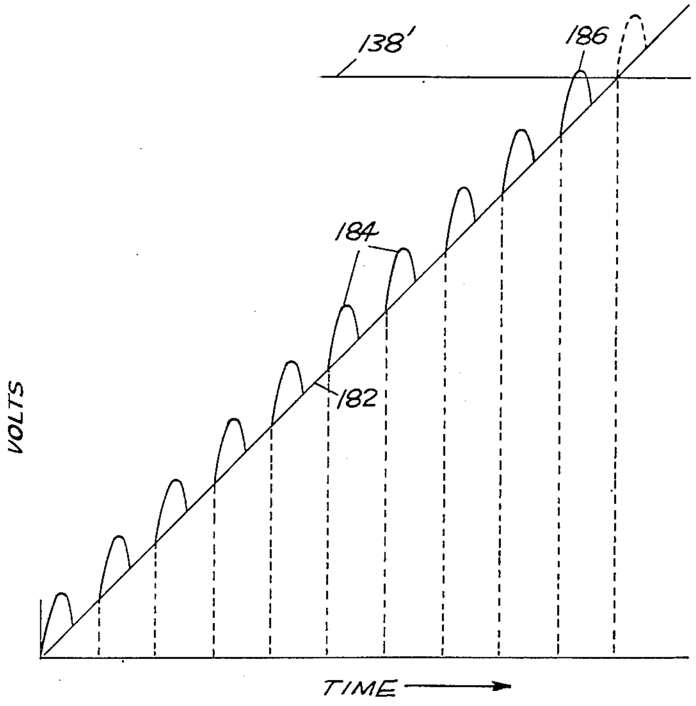
Fig. 3 is a graph illustrating a small portion of the rising voltage of the saw-tooth generator with synchronizing peaks thereon.

Since the sampling pulse 100 has a finite time duration it may interfere with the accuracy of the code readings. If, for example, this time duration is represented in Fig. 2 by the space between lines 172 and 174 the pulse 100 would overlap count intervals in the coincidence tubes, as shown, and thereby interfere with the accuracy of the code readings. One method of minimizing this is to make the pulses 68, and therefore pulses 70, 72, etc. (Fig. 2), narrower as shown by dotted lines 176 and 178, thus leaving small gaps as shown between dotted lines 176 and 178. Another more preferable method, and that used in the present embodiment, is a quantizing arrangement wherein the pulse 100 is synchronized with the pulses 70, 72 and 74. This arrangement is provided by connecting through unidirectional current devices 177, as crystals or diodes, the points 24, 26, 28, 30, 32, 34 and 36 of the delay line 38 by line 179 to the saw-tooth voltage generator 130 so that the rising voltage output of the saw-tooth generator in line 134 has small voltage quanta units or peaks occurring periodically once for each counting pulse, shown substantially at 180 as the voltage picture at anode 144. This may be seen more clearly in Fig. 3 where 182 is a small portion of the linear saw-tooth voltage rise on which is superimposed the quanta peaks 184 which, in the instance shown, has reached a count of eleven. If, for example, an 800 kilocycle oscillator is used as the oscillator 64, counting pulses will appear at anode 144 at the very rapid rate of 6.4 megacycles so that the portion of the saw-tooth wave, shown by 182, is actually less than two microseconds in duration. Therefore, for practical purposes, the portion of the signal voltage 138 appearing in this very short time may be represented by a straight line 138′. The sampling pulse 100 will occur at the quantum peak 186. In this manner, it is seen that because of quanta peaks 184, sampling pulses 100 will occur at definite increments of time. The leading edge of the sampling pulse 100 may be thereby synchronized with the pulse picture at the coincidence tubes so as to fall, for example, at the line 106. In a count of one hundred the error will be less than one per cent.

Assuming, for purposes of illustration, that the maximum voltage which might occur in signal 138 may be reached in twenty microseconds by the voltage from the saw-tooth voltage generator 130, it is desirable that the saw-tooth voltage generated have at least a twenty microsecond interval. The frequency divider 118 for providing pulses 122 for initiating the cycle should be a sufficiently small fraction of that of the frequency oscillator 64 so as to provide ample time for complete clearing and resetting of the apparatus between individual samplings. One such suitable frequency used was 1390 cycles per second which thereby provided for a reading approximately every 720 microseconds. Other frequencies may be used equally well.

Figure 4:
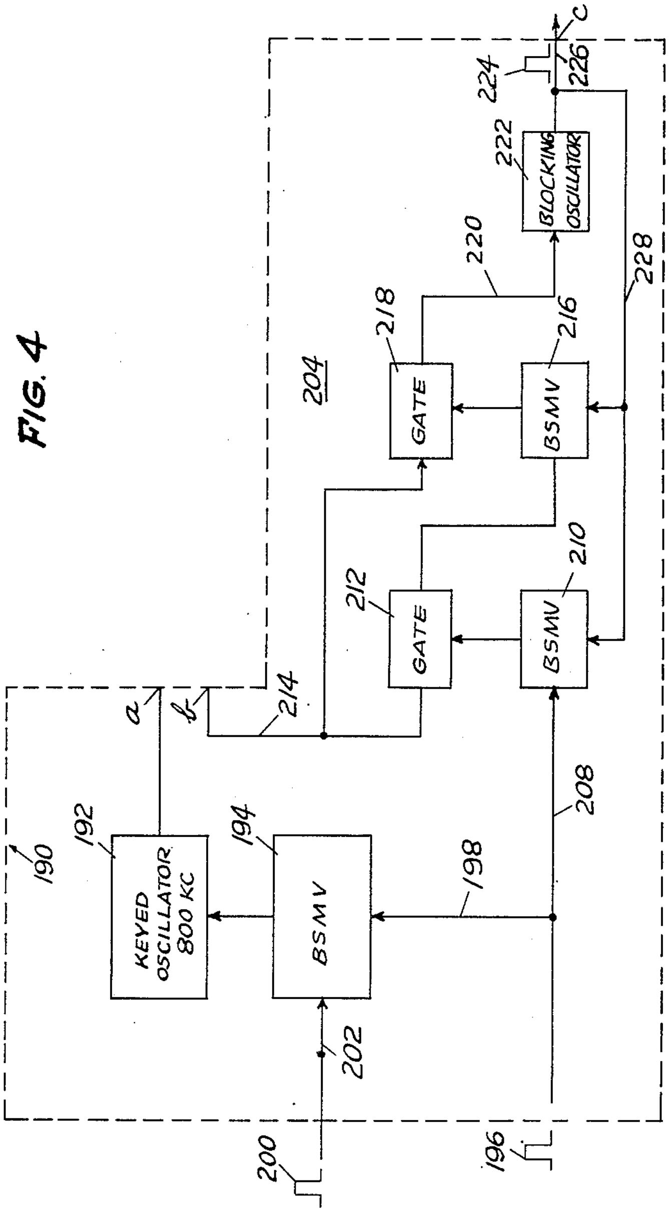
Fig. 4 is a block diagram, which, taken in connection with a portion of Fig. 1, comprises a second embodiment of the invention particularly adapted to convert pulse position and pulse time modulation intelligence to binary code.

By removing gate 46 so that the delay line 38 leads directly to counting circuit 48 and by replacing the circuits in the portion enclosed by dotted line 188 in Fig. 1 with circuits enclosed in dotted line 190 of Fig. 4, a second embodiment of the invention is produced which is particularly adapted for converting pulse time and pulse position modulation signals to binary code. Such intelligence consists of synchronizing and intelligence pulses, the interval between which, in this embodiment, is converted to binary code. In this embodiment, a fixed frequency keyed oscillator 192 is connected at point *a* to pulse former 66. The oscillator 192 may have any suitable frequency, but, for purposes of illustration in this embodiment, has a frequency of 800 kilocycles. The oscillator 192 is turned on and off by a bistable multivibrator 194. The bistable multivibrator 194 is energized by a synchronizing pulse 200 of the pulse position and pulse time modulation intelligence through line 202 to start the oscillator 192. Counting pulses 68 are thereby made to pass through the counting circuits. An intelligence pulse 196 of the pulse position or pulse time modulation intelligence is then led through line 208 to energize another bistable multivibrator 210 so as to open a gate 212 such as for example, a suitable electron tube gate. This permits pulses from line 180 which is connected at point *b* to line 214 to pass through gate 212. The first of these pulses energizes a third bistable multivibrator 216 which in turn opens a gate 128, which may be similar to gate 212. The pulses from 180 are thereby permitted to flow in line 220 to a blocking oscillator 222. As a result, only a first of these pulses, as a single sampling pulse 224, passes from the blocking oscillator 222 to line 96 through lines 226 and 97 which are connected at point *c*. The sampling pulse 224 is thereby in proper synchronism with the pulse picture at the coincidence tubes for obtaining binary conversion as explained in the first embodiment. The intelligence pulse 196 may thereby be considered as having been resynchronized for sampling purposes.

The intelligence pulse 196 also passes through line 198 to cause the bistable multivibrator to stop the oscillator 192 in preparation for another cycle similar to that explained above, and the sampling pulse 224 also appears through line 228 at the bistable multivibrators 210 and 216 so as to close gates 212 and 218 in preparation for the next cycle.

This invention is not limited to the particular details of construction and processes described, as many equivalents will suggest themselves to those skilled in the art. It is accordingly desired that the appended claims be given a broad interpretation commensurate with the scope of the invention within the art.

What is claimed is:

1. A device for converting the interval between two signal pulses to binary code comprising means for each of the digits in said code responsive to two simultaneous signal pulses for producing a code signal, means for generating fixed interval pulses, delay means arranged for making said pulses appear as pulse trains at each of said responsive means representing the more rapidly changing numbers in said code, the pattern of the pulse train at each of said last-mentioned responsive means being determined by said code, binary counting means for receiving said pulses from said delay means and effecting appropriate pulses at the remaining numbers of said responsive means, means responsive to a first of said two signal pulses for causing generation of said fixed interval pulses into said delay means; and means for making the other of said two signal pulses appear substantially simultaneously at each of said responsive means, thereby producing code signals at those responsive means where a pulse of said trains or said counters and said other pulse appear simultaneously.

2. A system for converting the interval between two signal pulses to binary code comprising means for each of the digits in said code responsive to two simultaneous signal pulses for producing a code signal, means for generating fixed interval pulses, delay means arranged for making said pulses appear as pulse trains at each of said responsive means representing the more rapidly changing numbers in said code, the pattern of the pulse train at each of said last-mentioned responsive means being determined by said code, binary counting means for receiving said pulses from said delay means and effecting appropriate pulses at the remaining numbers of said responsive means, means responsive to a first of said two signal pulses for causing generation of said fixed interval pulses into said delay means, means for synchronizing the other of said two signal pulses with the pulses appearing at said responsive means, and means for making said synchronized pulse appear substantially simultaneously at each of said responsive means, thereby producing code signals at those responsive means where a pulse of said trains or said counters and said other pulse appear simultaneously.

3. A system for converting a signal voltage to binary code comprising means for each of the digits in said code responsive to two simultaneous signal pulses for producing a code signal, means for generating fixed interval pulses, delay means arranged for making said pulses appear as pulse trains at each of said responsive means representing the more rapidly changing numbers in said code, the pattern of the pulse train at each of said last-mentioned responsive means being determined by said code, binary counting means for receiving said pulses from said delay means and effecting appropriate pulses at the remaining numbers of said responsive means, time control means responsive to said signal voltage for generating a signal pulse at each of said first-mentioned responsive means, thereby causing those of said first-mentioned responsive means having simultaneously one of said number pulses to produce code signals, and means for starting said time control means in known relation with the count in said delay and counting means.

4. A system for converting a signal voltage to binary code comprising means for each of the digits in said code responsive to two simultaneous signal pulses for producing a code signal, means for generating fixed interval pulses, delay means arranged for making said pulses appear as pulse trains at each of said responsive means representing the more rapidly changing numbers in said code, the pattern of the pulse train at each of said last-mentioned responsive means being determined by said code, binary counting means for receiving said pulses from said delay means and effecting appropriate pulses at the remaining numbers of said responsive means, time control means responsive to said signal voltage for generating a signal pulse at each of said first-mentioned responsive means, thereby causing those of said first-mentioned responsive means having simultaneously one of said number pulses to produce code signals, means for causing said last-mentioned signal pulse to occur in synchronism with said number pulses, and means for starting said time control means in known relation with the count in said delay and counting means.

5. A system for converting a signal voltage to binary code comprising means for each of the digits in said code responsive to two simultaneous signal pulses for producing a code signal, means for generating fixed interval pulses, delay means arranged for making said pulses appear as pulse trains at each of said responsive means representing the more rapidly changing numbers in said code, the pattern of the pulse train at each of said last-mentioned responsive means being determined by said code, binary counting means for receiving said pulses from said delay means and effecting appropriate pulses at the remaining numbers of said responsive means, time control means responsive to said signal voltage for generating a signal pulse at each of said first-mentioned responsive means, thereby causing those of said first-mentioned responsive means having simultaneously one of said number pulses to produce code signals, means for causing said last-mentioned signal pulse to occur in synchronism with said number pulses, means for starting said time control means in known relation with the count in said delay and counting means, and means for resetting said counting means after said code signals.

6. A system for counting pulses and converting the count into code notation comprising: a counting pulse generator; a plurality of devices, corresponding, respectively, to each of the digits in the code, for producing code signals; means, receptive of the counting pulses from said generator and connected to the aforesaid devices corresponding to the lower order digits of the code, for applying to said last-mentioned devices patterns of pulses for each counting pulse entering said means; said patterns of pulses being determined by the code notation of the lower order digits of the number being counted; and means, receptive of the counting pulses from said first-named means and connected to the aforesaid devices corresponding to the higher order digits of the code, for applying to said last-mentioned devices appropriate pulses determined by the code notation of the higher order digits of the number being counted.

7. A system for counting pulses and converting the count into code notation comprising: a counting pulse generator; a plurality of devices, corresponding, respectively, to each of the digits in the code, for producing code signals; a delay line, receptive of the counting pulses from said generator and connected at uniformly spaced points along the length thereof to the aforesaid devices corresponding to the lower order digits of the code, for applying to said last-mentioned devices patterns of pulses for each counting pulse entering said delay line; said patterns of pulses being determined by the code notation of the lower order digits of the number being counted; and means, receptive of the counting pulses from the end of said delay line and connected to the aforesaid devices corresponding to the higher order digits of the code, for applying to said last-mentioned devices appropriate pulses determined by the code notation of the higher order digits of the number being counted.

8. A system for counting pulses and converting the count into code notation comprising: a counting pulse generator; a timing pulse generator; means for synchronizing the operation of said timing pulse generator with the operation of said counting pulse generator; a plurality of devices, corresponding, respectively, to each of the digits in the code, for producing code signals; means, receptive of the counting pulses from said first-named generator and connected to the aforesaid devices corresponding to the lower order digits of the code, for applying to said last-mentioned devices during the interval of the timing pulse produced by said second-named generator patterns of pulses for each counting pulse entering said means; said patterns of pulses being determined by the code notation of the lower order digits of the number being counted; means, receptive of the counting pulses from said first-named means and connected to the aforesaid devices corresponding to the higher order digits of the code, for applying to said last-mentioned devices during the interval of the timing pulse produced by said second-named generator appropriate pulses determined by the code notation of the higher order digits of the number being counted and means for terminating the interval of said timing pulse and recording the code signals produced during said interval.

CONRAD H. HOEPPNER.

REFERENCES CITED

The following references are of record in the file of this patent:

UNITED STATES PATENTS

| Number | Name | Date |
|---|---|---|
| 2,272,070 | Reeves | Feb. 3, 1942 |
| 2,438,908 | Goodall | Apr. 6, 1948 |
| 2,485,821 | Gloess et al. | Oct. 25, 1949 |
| 2,508,622 | Pierce | May 23, 1950 |